United States Patent [19]

Rivera-Cruz

[11] 4,195,486

[45] Apr. 1, 1980

[54] ENERGY GENERATING DEVICE

[76] Inventor: Luis Rivera-Cruz, H & S Co. 9th M.T. Bn. 3rd FSSG. FMF PAC c/o FPO 96602

[21] Appl. No.: 966,263

[22] Filed: Dec. 4, 1978

Related U.S. Application Data

[63] Continuation-in-part of Ser. No. 781,130, Mar. 25, 1977, Pat. No. 4,145,890.

[51] Int. Cl.² ........................... F03G 3/00; F03G 7/00
[52] U.S. Cl. ...................................................... 60/675
[58] Field of Search ................................. 60/531, 675

[56] References Cited

U.S. PATENT DOCUMENTS

| 250,821 | 12/1881 | Landis | 60/675 |
|---|---|---|---|
| 2,442,466 | 6/1948 | Lorphelin | 60/675 |
| 3,509,716 | 5/1970 | Avery | 60/675 X |

*Primary Examiner*—Allen M. Ostrager

[57] ABSTRACT

An elongated arm, pivotally mounted at the center to a support structure includes a large, bulbous reservoir attached at either end thereof. The arm is hollow and a passageway therethrough joins the two reservoirs. A volatile fluid which vaporizes at a relatively low temperature (125° F. or less) is placed within the reservoir/passageway to provide the activating fluid for the device. A first insulated chamber including a heat exchange means with source of heat input in the walls thereof encapsulates each reservoir when the reservoir is pivoted to its lowermost point, causing the volatile liquid to vaporize and flow to the other end where it condenses and causes that end to lower. To hasten condensation of the fluid, a second, cooling insulated chamber encloses the reservoir when it is in its uppermost position. This second chamber includes a cooling substance in the walls thereof which rapidly cools the volatile fluid to its condensed state whereby the fluid forces the reservoir downwardly to the lowermost heat input position. An electrical generator or other energy converter is associated with and operated responsively to movement of the arm.

7 Claims, 2 Drawing Figures

ENERGY GENERATING DEVICE

REFERENCE TO RELATED INVENTIONS

This is a continuation-in-part of my copending application Ser. No. 781,130 filed Mar. 25, 1977, now U.S. Pat. No. 4,145,890.

BACKGROUND OF THE INVENTION

The present invention relates to the use of a volatile fluid which may be vaporized at a relatively low temperature and used as an activating agent to operate a pivot arm structure. The rocking movement of the pivot arm structure which results from the alternate vaporization and condensation of the volatile fluid at opposite ends of the structure generates mechanical energy at the central shaft which may be easily utilized directly or converted to electrical energy.

DESCRIPTION OF THE PRIOR ART

The most pertinent prior art known to applicant includes U.S. Pat. Nos. 271,639 to Iske and 250,821 to Landis. Both of these patents disclose oscillating motors activated by the reciprocal motion of a volatile fluid which is alternately vaporized and condensed at opposite ends of the structure, which pivotal motion is in turn used to generate mechanical energy.

While both of these patents disclose the basic concept utilized by the applicant, neither approaches the problem of the need to increase the efficiency in energy output by increasing the speed of vaporization/condensation of the volatile fluid.

SUMMARY OF THE PRESENT INVENTION

In the present invention the continuous vaporization and condensation of the volatile fluid operates a mechanical pivot arm, the movement of which is used to operate an electrical generator or other energy converter. A mechanical support structure includes a hollow arm pivotally mounted thereto having bulbous chambers or reservoirs at either end. The chambers are connected by a passageway through the hollow arm but otherwise are enclosed from the atmosphere. A prescribed amount of a volatile fluid such as Freon is placed within the bulbous reservoir and the entire structure is pivotally mounted at the mid-point of the arm to a frame. A heat input source which may be activated by solar heat, waste heat such as discharging hot water or the like, is positioned adjacent the lowermost point of the path of each bulbous chamber. When the volatile fluid condenses in one of the chambers, that chamber, because of its weight will move downwardly to its lowermost position and thereby raise the other end. Heat input at the newly lowered chamber will cause the volatile fluid to vaporize again and travel to the upper empty chamber where it will condense causing the upper end to lower; whereupon the cycle continuously repeats itself. Depending on the weight of the volatile fluid in the system and the length of the arms, considerable torque may be exerted at the mid-point due to the continuous see-saw motion of the arm.

An insulating chamber is located at each of the uppermost and lowermost positions of each bulbous reservoir. The first of these chambers includes walls which have conduits for the heat exchange medium, i.e., waste hot water, etc., and in its lowermost position the reservoir is received into the chamber where the heat is transferred from the waste water to the volatile fluid causing vaporization of the fluid. In a preferred embodiment the chamber opens as the reservoir is moving downwardly and when the reservoir is fully lowered the chamber closes around the reservoir to increase the efficiency of the heat transfer by concentrating the heat immediately around the reservoir rather than permitting its escape to the atmosphere.

The second of the insulating chambers is utilized at the uppermost position of the reservoir. The walls of this second chamber include conduits for a cooling medium such as liquid oxygen or hydrogen which increase the condensation rate of the volatile fluid in the reservoir. In a preferred embodiment this second chamber also opens as the reservoir moves upwardly and when the reservoir is uppermost the chamber closes around it to isolate the reservoir from the atmosphere.

In an alternate embodiment the insulating chambers do not open and close, but rather are constructed with an open side through which the reservoir moves. Once the reservoir has moved through the open side it is seated closely adjacent the surrounding chamber walls thereby maximizing the application of the heating/cooling medium to the volatile fluid and minimizing transfer of heating/cooling work to the atmosphere.

An energy converter, as for example, an electrical generator with its input shaft mechanically connected to the reciprocating pivotal structure, harnesses and converts the energy generated by the pivot structure to electricity, mechanical power, or the like. Although the generating system according to this invention may not be extremely efficient, if the heat and cooling input is relatively cheap or free, the system may prove very satisfactory.

It is apparent that the pivot structure might be connected to some mechanical motor output means, so that the energy is used directly rather than converting into electrical energy. Further, the pivot structure could have attached thereto secondary liquid chambers that are alternately raised and lowered to deliver a secondary liquid, such as water into an elevated reservoir, and the elevated water could then be used to operate a turbine or hydraulic motor.

Objects of the present invention include:

1. The provision of an economical energy system;
2. The provision of an economical system for the generation of electrical energy;
3. The provision of an apparatus as disclosed herein whereby the alternate vaporization and condensation of a volatile fluid works a pivot arm structure to generate energy which can be efficiently converted to mechanical or electrical output; and
4. The provision of an apparatus as disclosed whereby the alternate vaporization and condensation of a working volatile fluid are accelerated to increase the output of the energy generator.

Other objects and a fuller understanding of the invention will become apparent from reading the following description of a preferred embodiment in conjunction with the accompanying drawings in which.

DESCRIPTION OF PREFERRED EMBODIMENT

Figure 1:
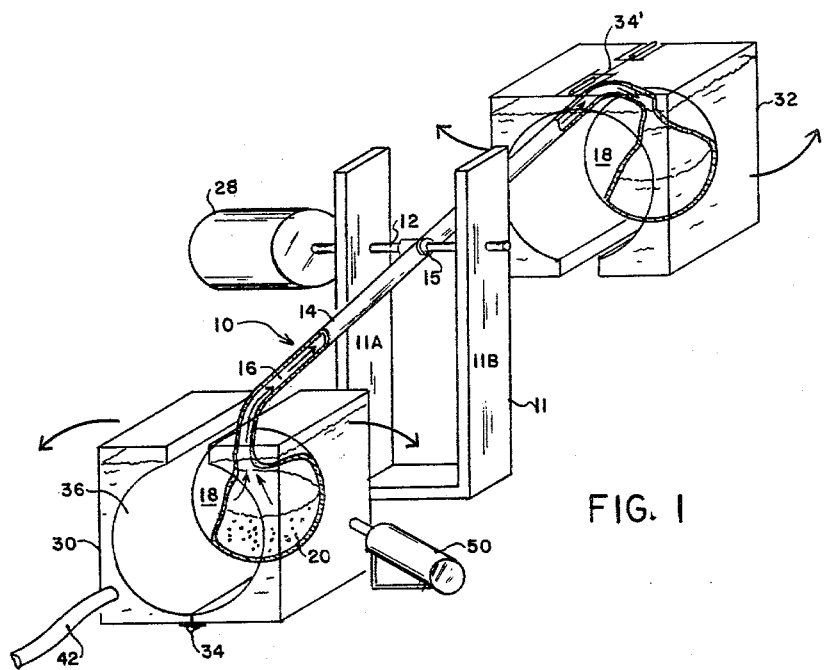
FIG. 1 is a partially schematic and partially cross-sectional side view of the apparatus according to a preferred embodiment.

Turning now to the drawings, there is illustrated in FIG. 1 a preferred embodiment of the energy generating device according to the present invention which includes, in general, a pivot structure 10 having an elongated arm 14 pivotally mounted thereto at the arm center, and an energy converting device 28 such as a motor, generator, or the like which transforms the energy developed by the pivotal motion of the arm structure 14 to a useful form of electrical or mechanical energy.

More specifically the pivot structure 10 includes a support frame 11 having a horizontal support shaft 12 journalled between the sides 11a, 11b, extending parallel to and at a point spaced from the support surface on which the frame 11 rests. The preferably tubular, elongated arm 14 is secured at its mid-point to the horizontal shaft by means of a coupling 15 which further transmits the pivotal movement of the arm 14 to the shaft 12, so that as the arm 14 reciprocates or oscillates, the shaft 12 is caused to reciprocally rotate through an arcuate path.

A reservoir 18 is attached at each end of arm 14 and a conduit, preferably in the form of passageway 16 extending through the tubular arm 14, provides communication between the two reservoirs 18. The reservoirs 18 and passageway 16 are enclosed from the atmosphere. A prescribed amount of a volatile fluid 20, such as, for example Freon 11 or Freon 113 is initially placed within the reservoir/passageway system. The volatile fluid may be any of a number of fluids which have a boiling point at or slightly above normal existing atmospheric conditions. For example, Freon 11 has a boiling point of 74.7° F. and Freon 113 has a boiling point of 117.6° F. Both of these boiling temperatures are easily reached, although the Freon 113 is probably preferred for summer use while Freon 11 may be preferred for winter use. The fluid might be replaced periodically throughout the year depending upon the season.

Still referring to the embodiment shown in FIG. 1, the structure also includes an insulating chamber 30 at each lowermost position of reservoir 18 and an insulating chamber 32 at each uppermost position of the reservoir 18. For simplicity of illustration only one from each pair of chambers 30,32 is shown in the drawing. Additionally, only one pivot structure 10 is shown for simplicity but it should be understood that multiple pivot arms may be added to increase the output.

The first and lowermost insulating chamber 30 includes heat exchange coils 40 in the walls thereof through which hot waste water is circulated to transfer heat to the volatile fluid and cause vaporization. The waste water is fed from its source to the coils 40 via the flexible conduit 42. It is known that heated water or other fluid is created as waste from many different processes, treatment plants, etc. so the source of waste water will not be discussed further. As the pivot arm 14 is moving reservoir 18 downwardly, the chamber 30 opens along hinged joint 34 to receive the reservoir into its hollow interior 36. When the reservoir 18 reaches its lowermost position the chamber closes around the reservoir so that the heat from the coils 40 is intensified around the volatile fluid to speed up vaporization rather than being lost to the atmosphere.

The insulating chambers 30,32 are opened and closed along the hinged joints 34,34' by means of a reciprocating pneumatic cylinder 50 which is of a conventional design. In the preferred embodiment at least one air cylinder 50 is connected to an exterior surface of each of the chambers 30,32 in such a position as to selectively pull or push the chamber open or closed to allow passage of the respective reservoir 18. Although an air cylinder is the preferred activating means 50, other mechanism such as hydraulic cylinders, etc. may be used. The activating means 50 may be automatically activated responsive to a pre-set timing device, a temperature sensor, limit switch setup, or other conventional mechanism.

The second insulated chamber 32 operates to open and close as it receives the reservoir 18 at its uppermost position along its hinged joint 34' as described for the first chamber 30. However, a cooling agent such as liquid oxygen or hydrogen is contained within an inner conduit 46 within the walls of chamber 32. Therefore, when the reservoir 18 is in its uppermost position and the chamber 32 is closed around it, the cooling effect is intensified and the volatile liquid is condensed more quickly.

Figure 2:
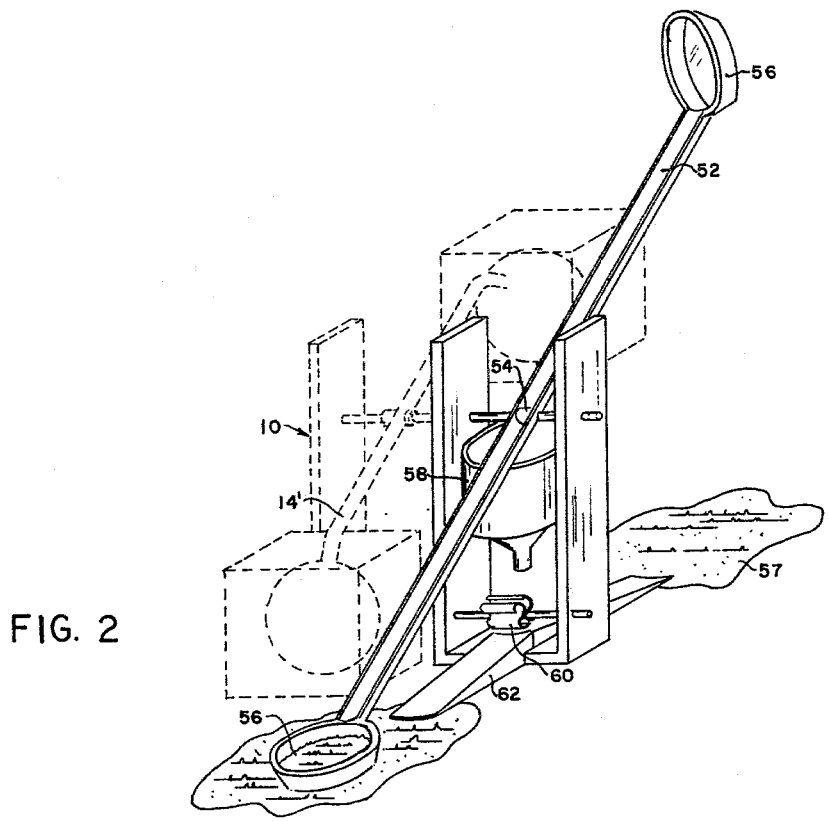
FIG. 2 is a partially schematic and partially cross-sectional side view of the device according to an alternate embodiment.

An alternate embodiment shown in FIG. 2 functions in the same manner as just described with the exception that the insulating chambers 100,102 are not hinged to open and close around the reservoirs 18. Rather, the chambers each have an open side 104 through which the reservoir 18 moves to a seated position closely within the walls of the chambers 100,102. Although some of the heating or cooling effect is lost to the atmosphere through the open side 104, the alternate vaporization and condensation of the liquid is still accelerated to a rate higher than has previously been capable with known systems wherein the heating/cooling agents were openly exposed to the atmosphere.

An energy conversion unit 28 such as an electrical generator, a motor, or other similar energy converting mechanism is attached to the rotating shaft 12 by means of an input shaft 26. Input shaft 26 may be connected directly to shaft 12, or through a series of gears to gear up or down the rotational motion thereof.

In operation, the embodiment illustrated in FIG. 1 is set in motion by the application of heat to the lowermost of the reservoirs 18 in which the liquid volatile fluid resides. Such application of heat will cause the volatile fluid to vaporize from its liquid state and flow to the opposite end where it will condense in the opposite reservoir 18, thereby causing the pivot arm 14 to tilt in the opposite direction from which it is initially positioned. As the opposite end of the reservoir 18 into which the vaporized volatile fluid 28 enters and condenses, and moves to its lowermost position, a second heat exchange means placed adjacent thus continues back and forth. The energy generated by the pivotal motion of arm 14 is then transferred through shaft 12 and 26 into the energy conversion unit 28.

Turning now to FIG. 2, by way of explanation, the structure of FIG. 1 is repeated in dotted lines and form the activating means for a different type of energy conversion unit. The similar parts in FIG. 2 which are repeated from FIG. 1 and have not been described will be illustrated as 10', 11', 12', and so forth. It should be recognized that the pivot arm structure 10' of FIG. 2 operates in the same manner, the only difference being in the energy converting mechanism 50.

The energy converting mechanism 50 according to FIG. 2 includes an elongated, open-top trough 52 rigidly connected to arm 14' and having a central opening 54 through the bottom thereof. Each end of the trough is provided with a container means 56 so constructed that when it is lowered into a storage reservoir 57 responsive to the corresponding tilting or lowering of arm 14', the corresponding container 56 is submerged therein and becomes full of a hydraulic activating fluid, such as water. A priming tank 58 is mounted beneath the opening 54 in trough 52 and contains a turbine or hydraulic motor 60 at the bottom opening thereto, so that when one of the containers 56 is elevated responsive to a lowering of the opposite end of arm 52, a supply of water will run down trough 52 through opening 54 into the priming tank 58. Subsequently, the hydraulic liquid in tank 58 flows through the bottom thereof past turbine 60 thereby activating a hydraulic motor 60, or a generator input shaft. As the water exits through a bottom opening 59 in priming tank 58 it is deposited into a return trough 62, which is slanted in either direction toward the storage reservoirs 57, thereby replenishing the supply of hydraulic fluid therein.

As is evident the operation of the pivot arm 14' thereby causes a continuing supply of water to be delivered into tank 58 to operate the hydraulic motor or turbine 60. It is equally evident that the weight of the condensed volatile liquid in the elevated reservoir 18' must exceed the weight of the water picked up by lowered container 56. In the embodiment of FIG. 2, therefore, the delivery of the hydraulic fluid into priming tank 58, and the passage by gravity therefrom past the turbine or water wheel 60 provides the energy for a motor or generator.

While two embodiments of the invention have been disclosed in detail, it is believed that various modifications and changes might be made to the embodiments illustrated and described without departing from the scope of the invention, which is set forth in the following claims.

What is claimed is:

1. An energy generating device comprising:
   (a) a pivot structure including:
      (i) a support means;
      (ii) an elongated arm pivotally connected at a point intermediate the ends thereof to said support means for reciprocal arcuate movement about a horizontal axis through said intermediate point, whereby each end of said arm moves back and forth between a first lowermost position and a second uppermost position;
      (iii) a reservoir attached to each end of said arm;
      (iv) a conduit extending between and connecting said reservoirs, said reservoirs and conduit being otherwise enclosed from the atmosphere; p2 (v) a prescribed quantity of volatile liquid which boils at a relatively low temperature deposited in one of said reservoirs;
   (b) a heat exchange means including a source of heat input thereto operatively associated with each reservoir when positioned in its first lowermost position for causing said volatile fluid in its liquid state to vaporize and flow to the opposite end where it cools and condenses said heat exchange means comprising a first and second insulating chamber surrounding each of said reservoirs when in the lowermost position, said first and second chamber connected to said source of heat input thereto in the walls thereof for causing said volatile fluid to vaporize and flow upwardly to the opposite of said reservoirs where it cools and condenses;
   (c) a third and fourth insulating chamber enclosing each of said reservoirs when in its uppermost position, said third and fourth insulating chamber including a cooling substance in the walls thereof for cooling said volatile fluid to its liquid state whereby it flows downwardly to the opposite of said reservoirs where it is heated and formed into a vapor; and
   (d) an energy conversion means connected to said pivot structure for transforming the pivotal movement of said arm to a useful form of output energy.

2. The energy generating device according to claim 1 wherein said energy converting device comprises an electrical generator having an input shaft operatively connected to and rotated responsive to the reciprocal movement of said pivot structure.

3. The energy generating device according to claim 1 wherein said support means includes a horizontal shaft journalled at either end to said support means for pivotal movement therein, and said elongated arm is secured to said shaft.

4. The energy generating device according to claim 1 wherein said source of heat input to said heat exchange means comprises a continuous supply of hot waste fluid.

5. The energy generating device according to claim 1 wherein said energy conversion means comprises an elongated trough rigidly connected to said elongated arm, a hydraulic fluid container attached to each end of said trough, a storage reservoir containing a hydraulic fluid positioned in the path of each of said tanks in their lowermost positions, means associated with said tanks for filling said tanks with said hydraulic fluid when in said lowermost position, an outlet opening in the bottom of said trough at the mid-point thereof, a hydraulic fluid priming tank positioned beneath said opening, a fluid responsive rotating member positioned at the bottom of said priming tank and operated responsive to the passage of water of hydraulic fluid therethrough, and a return trough means extending between the outlet of said priming tank and said storage reservoirs for returning hydraulic fluid to said storage reservoirs after passing through said priming tank.

6. The energy generating device according to claim 1 and further including a means for selectively opening and closing said first and second chambers to receive one of said reservoirs thereinto.

7. The energy generating device according to claim 6 wherein said means to open and close said chambers includes a hinged side wall in each of said first and second chambers and a reciprocating pneumatic cylinder connected to an exterior surface of each of said chambers in such a position as to selectively pull or push said chamber open or closed along said hinged side wall.

* * * * *